(12) United States Patent
Simu et al.

(10) Patent No.: US 9,461,835 B2
(45) Date of Patent: Oct. 4, 2016

(54) MULTICAST BULK TRANSFER SYSTEM

(75) Inventors: Serban Simu, Oakland, CA (US); Ying Xu, Emeryville, CA (US); Lukas Anliker, Emeryville, CA (US); Andrea Di Muzio, Emeryville, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 574 days.

(21) Appl. No.: 13/442,707

(22) Filed: Apr. 9, 2012

(65) Prior Publication Data

US 2012/0320732 A1 Dec. 20, 2012

Related U.S. Application Data

(60) Provisional application No. 61/473,270, filed on Apr. 8, 2011.

(51) Int. Cl.
*H04L 12/18* (2006.01)

(52) U.S. Cl.
CPC ................ *H04L 12/1868* (2013.01)

(58) Field of Classification Search
None
See application file for complete search history.

(56) References Cited

U.S. PATENT DOCUMENTS

| | | | | |
|---|---|---|---|---|
| 5,459,725 A * | 10/1995 | Bodner et al. | | 370/408 |
| 6,404,739 B1 * | 6/2002 | Gonno | | 370/410 |
| 6,700,893 B1 * | 3/2004 | Radha | | H04L 47/10 |
| | | | | 370/252 |
| 6,983,409 B1 * | 1/2006 | Vollmer et al. | | 714/748 |
| 7,035,217 B1 * | 4/2006 | Vicisano et al. | | 370/236 |
| 7,447,148 B2 * | 11/2008 | Gao et al. | | 370/216 |
| 7,813,324 B1 * | 10/2010 | Goel et al. | | 370/336 |
| 2002/0085498 A1 * | 7/2002 | Nakamichi | | H04L 12/2602 |
| | | | | 370/236 |
| 2002/0114283 A1 * | 8/2002 | Lee | | 370/252 |
| 2005/0147045 A1 * | 7/2005 | Alam et al. | | 370/236 |
| 2005/0174972 A1 * | 8/2005 | Boynton | | 370/337 |
| 2007/0081492 A1 * | 4/2007 | Petrovic et al. | | 370/401 |
| 2008/0031349 A1 * | 2/2008 | Lee et al. | | 370/535 |
| 2008/0049699 A1 * | 2/2008 | Li | | H04L 1/0025 |
| | | | | 370/342 |
| 2008/0056196 A1 * | 3/2008 | Ito | | H04W 40/24 |
| | | | | 370/331 |
| 2008/0256409 A1 * | 10/2008 | Oran | | H04L 1/0009 |
| | | | | 714/748 |
| 2009/0034556 A1 * | 2/2009 | Song et al. | | 370/471 |
| 2009/0075685 A1 * | 3/2009 | Beyer, Jr. | | 455/466 |
| 2010/0254392 A1 * | 10/2010 | Katar et al. | | 370/400 |
| 2011/0026422 A1 * | 2/2011 | Ma | | H04W 72/0453 |
| | | | | 370/252 |
| 2011/0083035 A1 * | 4/2011 | Liu et al. | | 714/4.1 |
| 2011/0116435 A1 * | 5/2011 | Liu et al. | | 370/312 |
| 2013/0215789 A1 * | 8/2013 | Lim | | H04L 45/04 |
| | | | | 370/254 |

* cited by examiner

*Primary Examiner* — Chirag Shah
*Assistant Examiner* — Joshua Smith
(74) *Attorney, Agent, or Firm* — Terry J. Carroll; Edell, Shapiro & Finnan LLC

(57) ABSTRACT

A data transfer system and method are described for providing transfer of data over a network between a sender and a plurality of receivers. Data is sent over a network to the plurality of receivers by the sender at a specified rate regardless of data loss. A receiver that identifies a lost block of data transmits a retransmission request to the sender. The sender responds to one or more retransmission requests by transmitting a repair packet to all receivers that contains blocks of data for which retransmission requests have been received.

18 Claims, 2 Drawing Sheets

MULTICAST BULK TRANSFER SYSTEM

RELATED APPLICATIONS

This application claims priority to U.S. Provisional Patent Application Ser. No. 61/473,270, which is hereby incorporated by reference in its entirety. This application incorporates by reference the specifications of the following applications in their entirety: U.S. Provisional Patent Application Ser. No. 60/638,806, filed Dec. 24, 2004, entitled: "BULK DATA TRANSFER PROTOCOL FOR RELIABLE, HIGH-PERFORMANCE DATA TRANSFER WITH INDEPENDENT, FULLY MANAGEABLE RATE CONTROL"; U.S. patent application Ser. No. 11/317,663, filed Dec. 23, 2005, entitled "BULK DATA TRANSFER"; and U.S. patent application Ser. No. 11/849,782, filed Sep. 4, 2007, entitled "METHOD AND SYSTEM FOR AGGREGATE BANDWIDTH CONTROL".

BACKGROUND

IP multicast is a technique for one-to-many and many-to-many real-time communication over an IP infrastructure in a network. It scales to a larger receiver population by not requiring prior knowledge of the receivers or how many receivers there are. Multicast uses network infrastructure efficiently by requiring the source to send a packet only once, even if it needs to be delivered to a large number of receivers. The nodes in the network (typically network switches and routers) take care of replicating the packet to reach multiple receivers such that messages are sent over each link of the network only once. The most common low-level protocol to use multicast addressing is User Datagram Protocol (UDP). By its nature, UDP is not reliable—messages may be lost or delivered out of order. Reliable multicast protocols such as Pragmatic General Multicast (PGM) have been developed to add loss detection and retransmission on top of IP multicast.

DETAILED DESCRIPTION OF THE INVENTION

Figure 1:
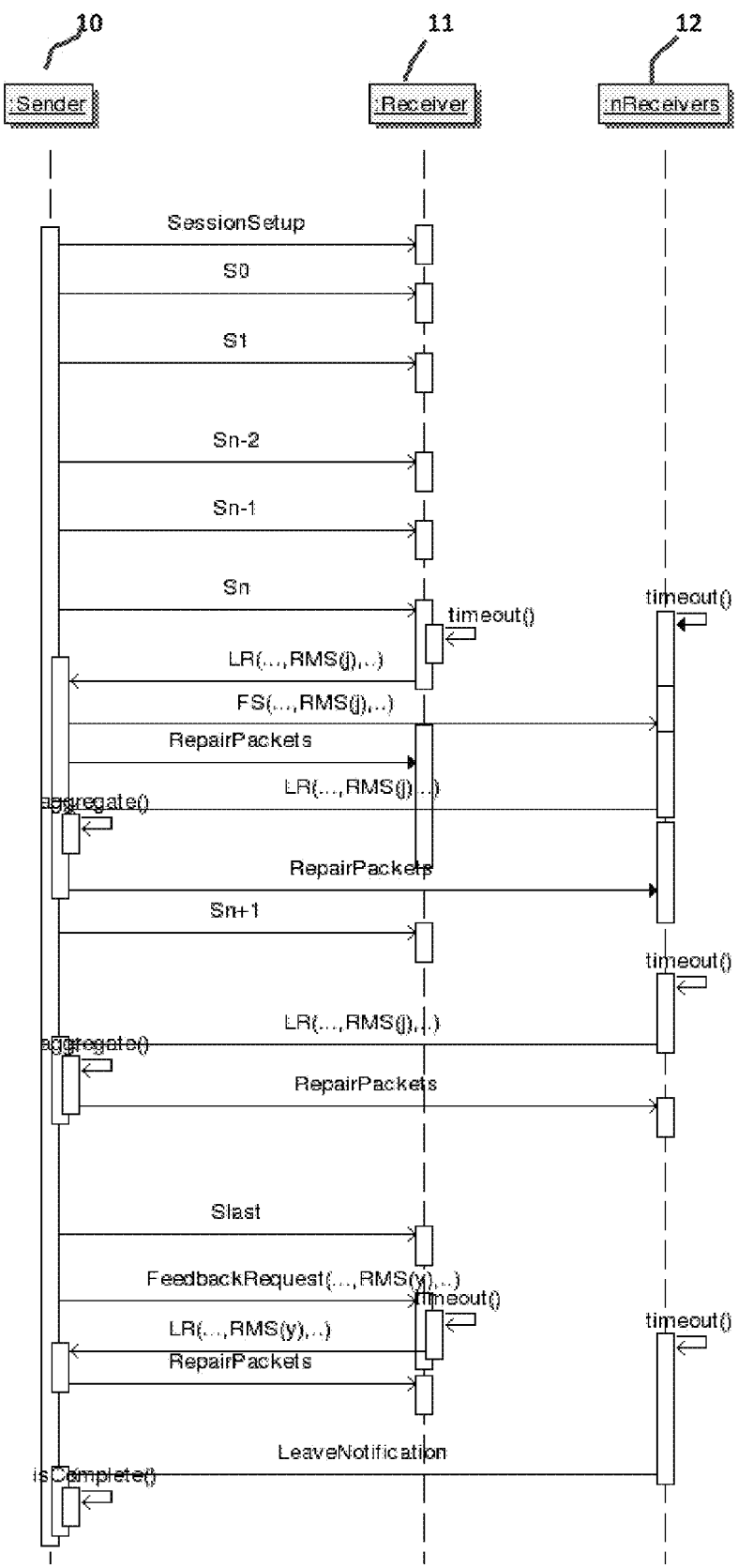
FIG. 1 illustrates the operation of the fasp-mc protocol according to one embodiment.

Described herein is a new point-to-multipoint transfer protocol based on IP multicast which is referred to herein as fasp-mc, with reference to a specific implementation of fasp-mc, referred to as ascp-mc. The transfer protocol enables data distribution to thousands of receivers in a scalable and efficient way. It solves typical large-scale distribution problems in the areas of digital cinema, digital signage, or VOD distribution to cable head-ends such as: 1) sending files of any size, including very large files; 2) transferring concurrently to thousands of receivers; and 3) making most efficient use of the existing network infrastructure, such as satellite broadcast networks, to transport IP multicast packets.

Design Principles of fasp-mc

The fasp-mc protocol is a reliable IP multicast transport protocol that ensures reliability, scalability, transport efficiency and security. It is based on the following principles: 1) shortest end-to-end distribution time; 2) no pre- and post-transmission delays (e.g. due to FEC (forward error correction) coding/decoding); 3) the sender (almost) never waits for receiver feedback—it always sends data at a target send rate; 4) continuous repair of packet losses while sending data; 5) optimal efficiency; 6) no transmission of unneeded packets; 7) single repair packet recovers different losses on different receivers (use of FEC); 8) minimized feedback traffic; 9) scalability; 10) support for large receiver sets and transfers of large files and file sets. The fasp-mc protocol does not implement any congestion avoidance or dynamic rate control mechanism but rather always sends data at a configurable target rate. On the one hand, this is due to the fact that congestion avoidance in multicast data distributions is highly complex. On the other hand, most multicast-enabled network environments offer ad hoc Quality of Service functionality with bandwidth reservations (satellite networks offer this natively).

High-Level Protocol Description

The transmission of a file or a set of files with fasp-mc occurs in distinct stages, called transmission phases. A transmission always starts with the session initiation phase, in which the sender announces the transmission and receivers join that transmission. During the continuous repair phase, the actual data transmission takes place, including repair of regular data loss. An optional out-of-window repair phase is kicked off if some receivers have not received all data during the continuous repair phase. In order to transition from one phase to the next, the protocol uses feedback from the receivers and timing information (timeouts). In addition, there is an exclusion strategy that defines how to treat "misbehaving" receivers, and a termination strategy that decides when to terminate a transmission.

Session Initiation

The session initiation phase is used by the sender to announce a transmission and determine which receivers will join the session. During this phase, the sender sends out session announcement packets periodically for a predetermined period of time. The packets contain basic session information such as feedback server address, packet size, segment size, etc. Upon reception of a session initiation packet, a receiver who wants to join the session responds with a session acknowledgement packet, which allows the sender to know which receivers take part in the transmission. Optionally, the session initiation packets might include transfer of metadata that is needed by receivers before file data can be received as described below.

Metadata and Data Subsessions

The transfer of file data can only occur once the receivers know where and how to store that data. The "where and how" is called transfer metadata and contains information like destination file paths and names, file sizes, access rights, etc. Transfer metadata is usually relatively small. In that case, it is inlined in the session initiation packet. However, if many files or entire directory trees are distributed within a single transmission, the metadata can become much larger. In that case, transfer metadata is transferred just like a regular file within the so-called metadata subsession. This subsession works exactly like the data subsession that transports the actual file data subsequently. A data subsession includes a continuous repair phase and an optional out-of-window repair phase as described below.

Continuous Repair

The continuous repair phase is the main data transfer phase, during which the sender sends file data (also called original data) at its target bandwidth, unless it needs to resend lost packets. Packet loss information is determined from feedback that receivers send back to the sender regularly. During continuous repair, data is handled such that all disk I/O is sequential (for performance reasons). This applies to both the sender as well as the receivers. The sender keeps data it has read from disk and sent out on the network in a read cache in memory until all receivers have acknowledged its reception. This prevents the sender from having to go back and re-read data from disk when packet loss is signaled. The receiver caches received non-contiguous data chunks in memory and flushes them to disk only when the missing packets are received, again with the goal to optimize disk throughput thanks to sequential disk access. The sender and receiver caches work in a similar fashion as the sliding window in protocols like TCP, with two differences: 1) ascp-mc uses the sliding window mainly for performance reasons (sequential disk I/O) instead of packet numbering and reliability, and 2) the ascp-mc sender will not wait for full reception of the entire window by all receivers. If the window (cache) reaches a configurable maximum size, the window is just moved along and new data is sent, potentially leaving some receivers behind with losses. These are repaired later on during the out-of-window repair phase.

To repair lost packets, the system does not just resend the corresponding originals. Instead, a repair packet is generated that has the potential to repair multiple uncorrelated (different) losses at different receivers. Repair packets are calculated based on forward error correction (FEC) techniques, where all packets in a segment (80 packets per default) are combined in such a way that a single repair packet can repair any single packet loss within the segment (and two repair packets can repair any two losses, etc.). With large receiver populations, this repair technique can reduce the amount of sent-out repair data by orders of magnitude.

Out-of-Window Repair (OOW Repair)

Due to the fact that the sender and receiver caches are limited in size, receivers might still be missing packets after the continuous repair phase. These missing packets are repaired during the OOW repair phase (named after the fact that they fell outside of the repair window of the continuous phase). The OOW repair phase might not be able to reach the target send rate due to random disk access. However, the continuous repair phase is usually able to repair most if not all packet loss, so the amount of data to retransmit is very limited.

Exclusion Strategy

The fasp-mc protocol is designed to transfer data efficiently to thousands of receivers simultaneously. But what should it do if the various receivers behave in completely different manners (e.g. because of highly variable network conditions or different hardware performance)? What should happen if 2 out of 100 receivers observe much higher packet loss than the rest? The answer is provided by the exclusion strategy implemented in the ascp-mc sender. It excludes individual receivers from the transmission in order to guarantee best performance for the remaining (majority of) receivers. The exclusion is based on the losses signaled by an individual receiver in relation to the loss signaled by the majority of receivers.

The exclusion strategy in ascp-mc is configured with the following sender command line options:

--es-lossfactor PERCENT: the loss factor. A receiver is excluded if its losses are higher by this factor than the average loss of "the majority of receivers". Default 150%

--es-maj PERCENT: the definition of what is considered "the majority of receivers". Default 90%

--es-startms N: the earliest milestone after which the strategy starts excluding receivers. During the beginning of the transfer, the exclusion strategy remains inactive in order to prevent "false" exclusions due to statistically insufficient data. Default 10.

With the default values, a receiver is excluded from the transmission if it has 1.5 more losses than 90% of the remaining receivers. Excluding a receiver does not mean that the receiver cannot participate in the transmission anymore. Instead, the sender simply ignores an excluded receiver's feedback, i.e. it will not attempt to repair that receiver's losses. The receiver continues receiving all packets sent out by the sender and might actually be re-integrated in the transmission as a regular receiver if its average loss rate approaches that of the majority.

Termination Strategy

The decision when to terminate a transmission in the optimal case is simple: as soon as all receivers have received the entire content. With many heterogeneous receivers and external transmission constraints (i.e. deadline), the problem becomes more subtle. As with the exclusion strategy, the ascp-mc sender allows to configure the termination behavior. The termination strategy offers the following criteria and conditions for ending a transfer: 1) Coverage: Terminate the transmission if the coverage (i.e. the number of receivers that have successfully received all content) reaches a given percentage, 2) Time: Terminate the transmission if a given absolute time (deadline) is reached or if the transmission has been running for a maximum duration, and 3) Volume: Terminate the transmission if the total amount of bytes sent exceeds a given threshold, e.g., 1.5 times the file data. Multiple of these criteria can be used at the same time where the first match will terminate the transmission.

The coverage condition may provide additional criteria that allow the transmission to continue in order to increase the coverage further, but only if the cost for doing so is reasonable. This is expressed as a coverage increase that needs to be reached without exceeding a given transmission volume increase.

--ts-coverage PERCENT: the minimum coverage to reach, i.e. the minimum percentage of receivers that must successfully receive the transmission before stopping it.

--ts-coverage-inc PERCENT: the minimum expected reception coverage increase per send volume increase for continuing the transmission after the minimum coverage is reached.

--ts-deadline DATETIME: absolute date and time until which the transmission must terminate. E.g. "2011-02-25 10:00:00 GMT"

--ts-max-duration DURATION: the maximum acceptable duration of the transmission. e.g. 4 h, 00:30:00

--ts-max-idle-ms N: the maximum number of milestones without feedback from receivers. Exceeding this limit will terminate the transmission.

--ts-max-sendvol PERCENT: the maximum send volume as percentage of the original file data. When reached, the transmission is terminated.

--ts-sendvol-inc PERCENT: the send volume increase. See --ts-coverage-inc.

Feedback Rate

A main challenge for scaling transmissions to thousands of receivers is minimizing the feedback traffic from receivers. This is achieved with multiple techniques including the reduction of the feedback information itself, the frequency of feedback messages and feedback suppression. The ascp-mc application offers a mechanism to tune the system in that respect by exposing a maximum aggregate feedback bandwidth that the sender is willing to accept. Based on that value, the algorithm will tune all necessary parameters accordingly.

Linux Version of ascp-mc

A version of the ascp-mc application has been developed that is available as two command-line applications (sender.sh and receiver.sh) for Linux operating systems that are bundled in the same tarball that is extracted to an installation directory. The tarball includes the necessary Java Runtime Environment (JRE). This will create the following directory structure:

```
/opt
    /aspera
        /ascp-mc
            . . .
            sender.sh
            receiver.sh
            /config
            logs
            /jre
```

In order to execute a transmission, the receivers have to be started first:

receiver.sh [OPTIONAL ARGUMENTS]

Subsequently, the sender is launched with the desired source file or directory to be transmitted.

sender.sh [OPTIONAL ARGUMENTS] SOURCE [DESTINATION]

The receiver command line options include:
java MulticastReceiverApp [options . . . ]
--bind-mc IPADDR_OR_NAME: Sets the ip address or the name of the network interface for multicast traffic. E.g. 10.65.22.9, eth0
--cache-size BYTES: Sets the maximum amount of memory to allocate for the data cache. e.g. 1 GB, 1.5 g, 500 mb
--docroot-dir PATH: The docroot directory path. All received files will be stored within this directory.
--id (--host-id) ID: Force the host ID to the given value. If not specified, a random ID is chosen automatically. E.g. 1, 524563774234
--idle-timeout DURATION: The maximum duration a receiver waits for packets from a sender before terminating the transfer. E.g. 2 m (=2 minutes), 00:05:00 (=5 minutes)
--mc-group ADDRESS:PORT: Sets the multicast group. E.g. 224.224.224.0:10000
--net-receive-buffer BYTES: Sets the socket receive buffer size. E.g. 1 MB, 1 m, 512000
--net-send-buffer BYTES: Sets the socket send buffer size. E.g. 1 MB, 1 m, 512000
--no-io: Disables disk io.
--overwrite: Allow files to be overwritten with newly received data.
--progress-frequency DURATION: The frequency at which the receiver should Log progress. E.g. 2 s (=2 seconds), 00:00:10 (=10 seconds)
--runtime-dir PATH: The path of the directory where runtime information is stored.
--thread-count N: Sets the number of threads to use. Defaults to twice the number of CPU cores. E.g. 4, 8
-Z (--packet-size) BYTES: Sets the packet size in bytes, including the size of UDP/IP headers. E.g. 1 KB, 1 k, 1500 b, 1500.
-h (--help): Prints this help message.

The sender command line options include:
java MulticastSenderApp [options . . . ] SOURCE DESTINATION
SOURCE: The source path. May denote a single file or a directory. In the latter case, all files in the directory and any subdirectories are transferred. DESTINATION: The destination path, relative to the receivers' docroots.
--bind-mc IPADDR_OR_NAME: Sets the ip address or the name of the Network interface for multicast traffic. E.g. 10.65.22.9, eth0
--cache-size BYTES: Sets the maximum amount of memory to allocate for the data cache. E.g. 1 GB, 1.5 g, 500 mb
--es-lossfactor PERCENT: Exclusion strategy: the loss factor. A receiver is excluded if its losses are higher by this factor than the average loss of "the majority of receivers". E.g. 1.5, 200%
--es-maj PERCENT: Exclusion strategy: the definition of what is considered the "majority of receivers". E.g. 80%, 0.55
--es-startms N: Exclusion strategy: the earliest milestone after which the strategy starts excluding receivers. During the beginning of the transfer, the exclusion strategy remains inactive in order to prevent "false" exclusions due to statistically insufficient data.
--fb-addr ADDR: The IP address or DNS hostname to advertise to receivers for feedback traffic. E.g. 10.34.23.1, mcsender.myorg.org
--fb-port N: The UDP port for feedback traffic
--fec-k N: The number of packets in a segment.
--fec-procs N: The number of processors for parallel FEC encoding.
--id (--host-id) ID: Force the host ID to the given value. If not specified, a random ID is chosen automatically. E.g. 1, 524563774234
--mc-group ADDRESS:PORT: Sets the multicast group. E.g. 224.224.224.0:10000
--net-receive-buffer BYTES: Sets the socket receive buffer size. E.g. 1 MB, 1 m, 512000
--net-send-buffer BYTES: Sets the socket send buffer size. E.g. 1 MB, 1 m, 512000
--no-io: Disables disk io.
--read-ahead N: The number of segments to "read ahead" when sending file data.
--runtime-dir PATH: The path of the directory where runtime information is stored.
--si-duration N: The duration of the session initiation process in milliseconds.
--si-period N: The time between repeated session initiation messages in milliseconds.
--thread-count N: Sets the number of threads to use. Defaults to twice the number of CPU cores. E.g. 4, 8
--ts-coverage PERCENT: Termination strategy: the minimum coverage to reach, i.e. the minimum percentage of receivers that must successfully receive the transmission before stopping it.
--ts-coverage-inc PERCENT: Termination strategy: the minimum expected reception coverage increase per send volume increase for continuing the transmission after the minimum coverage is reached.
--ts-deadline DATETIME: Termination strategy: absolute date and time until which the transmission must terminate. E.g. "2011-02-25 10:00:00 GMT"
--ts-max-duration DURATION: Termination strategy: the maximum acceptable duration of the transmission. E.g. 4 h, 00:30:00

--ts-max-idle-ms DURATION: Termination strategy: the maximum acceptable duration without feedback from receivers. Exceeding this limit will terminate the transmission. e.g. 4 h, 00:30:00

--ts-max-sendvol PERCENT: Termination strategy: the maximum send volume as percentage of the original file data. When reached, the transmission is terminated.

--ts-sendvol-inc PERCENT: Termination strategy: the send volume increase. See --ts-coverage-inc.

--ttl N: The time-to-live of sent out multicast packets. e.g. 2, 16

-Z (--packet-size) BYTES: Sets the packet size in bytes, including the size of UDP/IP headers, e.g. 1 KB, 1 k, 1500 b, 1500.

-h (--help): Prints this help message.

-l (--target-bw) BANDWIDTH: Sets the target send bandwidth in bits per second, e.g. 10 Mbps, 10 mbps, 10 m, 10000000

Fasp-mc Algorithm Description

An example of the Fasp-mc algorithm is described with reference to the following

DEFINITIONS

Segment—A fixed-size chunk of the original data. Original data is divided into segments, which serve as the basis for FEC computations.

Reception milestone: imagine the file as a sequence of fixed size chunks. The end of every chunk is a reception milestone and it is used by the algorithm to determine when a receiver sends feedback. As soon as a receiver receives a packet (any packet) for chunk J+1, it knows reception milestone J has been reached so it can sends feedback relative to reception milestone J.

Sliding window: when a receiver reports losses, it only analyses losses on a part of the file starting at the last reception milestone and going back. This window moves during the reception. The current window has to be kept in memory both on the receiver and on the sender. NOTE: for a given reception milestone the window is fixed and it does not change with the receiver.

Feedback report timespan: in order to prevent feedback implosion, the receivers have to span their loss report over time. This can be achieved using a spanning function returning a time between 0 and a maximum value (the feedback report time span).

Feedback request: an explicit request for feedback sent by the sender. The request is outside the algorithm scheme, it does not involve any window. An artificial reception milestone is used to let sender and receivers agree upon a common token.

Repair task: is the sender activity to compute and send repair packets.

RMS=reception milestone size (# segments)

RM(i)=i-th reception milestone

SWS=sliding window size (# segments)

SW(i)=i-th sliding window. The window to report loss about when at i-th reception milestone FRTS=feedback report time span (duration)

Si=i-th segment in the file. A segment is defined by the encoding algorithm; its size is in number of packets.

UpdateID=for a given set of RMS, SWS, FRTS the sender uses an UpdateID. This is used in order to detect receiver misconfiguration in cases where the values need to be changed during the transmission.

LR=Loss report, list of losses per segment at a given RM that a receiver communicates back using the back channel.

FS=Feedback Suppression message. It contains the list of already known by the sender loss report.

OOW=out of the window. It refers to the losses (missing packets) outside the current sliding window.

RTT=round-trip time which is in fact the sum of the multicast channel latency and the back channel latency.

timeout( ) function: is the spanning function used by receivers to compute the next reporting time.

aggregate( ) function: is the aggregation function used by the sender to avoid sending unnecessary repair packets for the same RM. Aggregation works in two directions. While the sender sends repair packets, received loss reports are aggregated together to generate the next repair packets set: if receiver j reports 5 losses on Sk and receiver k reports 7 losses on Sk, the sender aggregates the two values and prepares to send 7 repair packets for segment Sk. When it receives a loss report for RM(i), it verifies that the loss report has not already been covered: the sender keeps track of how many repair packets it has sent for every segment at RM(i), let's say 5 on Sj. If receiver k sends a loss report at RM(i) with 7 losses on Sj, the sender only sends two more repair packets. Aggregation only works on a given RM. As soon as RM(i) has been reached on the receivers, aggregation information for RM(i−1) are discarded (to limit memory usage).

FIG. 1 illustrates an example of the algorithm's operation with reference to a sender 10, a receiver 11, and a plurality of other receivers 12. The sender sets up the session using a session setup message. This message contains all the necessary information for the receivers to join the session, plus an initial value for RMS, SWS and FRTS. Note that at this point all receivers joining the session know these values (otherwise they would not have joined). As soon as the session is setup the sender starts sending original data starting from S0 and it keeps sending originals until the first loss report is signaled. Receivers receive original data as they arrive and store them in memory leaving holes when a packet is missing. As soon as a receiver reaches an RM it computes a report time using timeout( ) and on expiration it sends back an LR. The sender receives the LR and immediately generates FS, then it uses aggregate( ) to eliminate unnecessary repair request requests and if no other repair task is currently running it creates one and starts it. As soon as there are no more repair tasks pending the sender restarts to send originals from where it left. When the sender receives an LR for RM(i), it discards all information regarding RM(i−1) and it updates its current window (discarding the file chunk that is no longer part of the window and loading the new chunk). Note that the sender window is not exactly the same as the receiver window since it contains one (or more) chunk of data yet to be sent. From this moment on the sender will discard any LR for RM(k) with K<i. After sending the last packet the sender sends a FeedbackRequest to trigger feedback from those receivers that did not receive the last packet or that have OOW losses to repair. When a receiver completes the reception (all packets have been either received or repaired) it sends a LeaveNotification. The sender keeps sending FeedbackRequests (increasing the artificial RM) until one of the termination condition is reached: receivers with losses answer to the FeedbackRequest with LR computed on the whole file up to the maximum report size specified. As a consequence, repair packets will be generated and the receiver performs random access to the file in order to repair missing packets.

Two important features of the algorithm are loss aggregation and feedback suppression. Aggregation consists in considering all loss reports received in a milestone to compute the minimum number of repair packets needed per segment. Feedback suppression consists in informing receivers about the losses the sender is already aware of in the milestone to avoid sending redundant feedback. Both work on a milestone based timing: when a new milestone is triggered by the reception of a feedback packet, the sender resets some of its states and starts performing aggregation and feedback suppression on the related sliding window. In order to implement these features the sender keep three pieces of information per segment: 1) absolute start index, the index of the last produced parity packet; 2) milestone start index, the value of absolute start index at the beginning of the milestone; and 3) loss count, the absolute aggregated loss count. From the previous values:

Loss count reported in the milestone=loss count−milestone start index

Losses to still be repaired in the milestone=loss count−absolute start index

Figure 2:
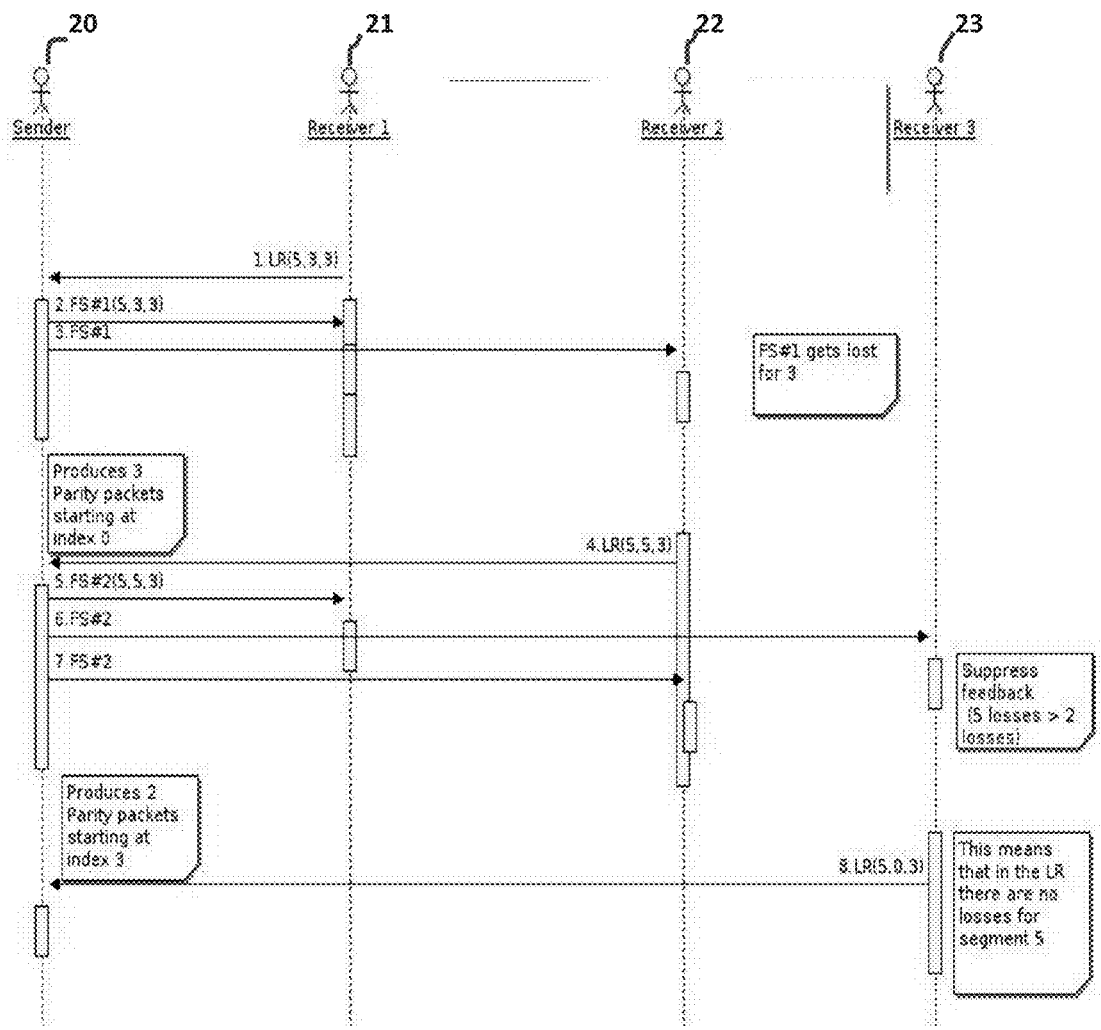
FIG. 2 illustrates aggregation and feedback suppression in the fasp-mc protocol.

Parity packet already produced in the milestone=absolute start index−milestone start index Values are updated in three cases:

new loss report: loss count+=reported loss count−loss count reported in the milestone (if reported loss count>loss count reported in the milestone)

new repair task issued: absolute start index=loss count new milestone: milestone start index=absolute start index An example of the operation of these features is illustrated by FIG. 2 with reference to a sender 20, a receiver 21, a receiver 22, and a receiver 23. The format for the FS and LR messages is as follows: LR (segment, losses, milestone) and FS (segment, losses, milestone). The milestone is in common for all reported segments for both FS and LR messages. In the example scenario illustrated in FIG. 2: receiver 21 has 3 losses in segment 5 in milestone 3, receiver 22 has 5 losses in segment 5 in milestone 3, and receiver 23 has 2 losses in segment 5 in milestone 3. In milestone 3, all three receivers have losses on segment 5. This example shows loss aggregation during the milestone (after the LR from receiver 22, only 2 additional repair packets are computed and sent) and feedback suppression (with redundancy) preventing receiver 23 from sending send feedback.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A data transfer system for providing transfer of data over a network between a sender and a plurality of receivers, comprising:

a sender configured to transmit segments of original data to the receivers over the network at a configurable target rate wherein each segment is made up of a specified number of packets;

a plurality of receivers, each configured to receive the transmitted segments and to detect when packets of a segment are lost;

wherein the receivers are configured to send feedback to the sender in a form of a loss report that identifies which packets of a segment are lost;

wherein the sender is configured to respond to loss reports by generating a repair packet that is able to repair multiple uncorrelated and different lost packets at different receivers using forward error correction techniques and transmitting the repair packet to the receivers; and, wherein the sender is configured to exclude a particular receiver, such that the sender will not respond to feedback from the particular receiver, if losses of the particular receiver are higher than an average loss of a majority of other receivers by a configured percentage of the average loss of the majority of the other receivers.

2. The system of claim 1 wherein all packets in a segment are combined such that a single repair packet can repair any single packet loss within the segment.

3. The system of claim 1 wherein the sender is configured to maintain a sliding window with a configurable maximum size that contains segments that have been or are about to be transmitted and that is moved along as new original data is transmitted, and further configured to, during a continuous repair phase, respond with repair packets only to loss reports that identify lost packets belonging to segments currently contained in the sliding window.

4. The system of claim 3 wherein the sender is configured to transmit repair packets corresponding to loss reports that identify lost packets belonging to segments not currently contained in the sliding window during an out-of-window repair phase that occurs after the continuous repair phase.

5. The system of claim 4 wherein the sender is configured to transmit, after all original data is transmitted, a feedback request to the receivers, the feedback request triggers, during the out-of-window repair phase, loss reports from receivers having packet losses.

6. The system of claim 1 wherein the receiver is configured to cache received non-contiguous packets in memory and flush the packets to disk only when missing packets are received.

7. The system of claim 1 wherein the sender is configured to aggregate the loss reports received from different receivers in order to minimize a number of repair packets that need to be transmitted for a particular segment.

8. The system of claim 1 wherein the sender is configured to, after receiving a loss report from a receiver identifying one or more lost packets in a particular segment, send a feedback suppression message to inform the other receivers of a number of lost packets in that segment that the sender already has knowledge of.

9. The system of claim 1 wherein the sender is configured to re-integrate an excluded receiver if the excluded receiver's losses approach the average loss.

10. The system of claim 1 wherein the sender is configured to terminate the transmission if a number of receivers that have successfully received all content, reaches a given percentage.

11. The system of claim 1 wherein the sender is configured to terminate the transmission if a given absolute time is reached or if the transmission has been running for a specified maximum duration.

12. The system of claim 1 wherein the sender is configured to terminate the transmission if a total amount of bytes sent exceeds a given threshold.

13. A method for operating a sender to transfer data over a network to a plurality of receivers, comprising:

transmitting segments of original data to the receivers over the network at a configurable target rate wherein each segment is made up of a specified number of packets;

receiving feedback from the receivers in a form of a loss report that identifies which packets of a segment are lost;

responding to loss reports by generating a repair packet that is able to repair multiple uncorrelated and different lost packets at different receivers using forward error correction techniques and transmitting the repair packet to the receivers;

after receiving a loss report from a receiver identifying one or more lost packets in a particular segment, sending a feedback suppression message to inform other receivers of a number of lost packets in the particular segment that the sender already has knowledge of, receipt of the feedback suppression message by the other receivers causing the other receivers to suppress sending loss reports for the number of lost packets in the particular segment that the sender already has knowledge of; and wherein the sender is configured to exclude a particular receiver, such that the sender will not respond to feedback from the particular receiver, if losses of the particular receiver are higher than an average loss of a majority of other receivers by a configured percentage of the average loss of the majority of the other receivers.

14. The method of claim 13 wherein all packets in a segment are combined such that a single repair packet can repair any single packet loss within the segment.

15. The method of claim 13 further comprising:

maintaining a sliding window with a configurable maximum size that contains segments that have been or are about to be transmitted and that is moved along as new original data is transmitted; and during a continuous repair phase, responding with repair packets only to loss reports that identify lost packets belonging to segments currently contained in the sliding window.

16. The method of claim 15 further comprising transmitting, during an out-of-window repair phase that occurs after the continuous repair phase, repair packets corresponding to loss reports that identify lost packets belonging to segments not currently contained in the sliding window.

17. The method of claim 16 further comprising transmitting, after all original data is transmitted, a feedback request to the receivers, the feedback request triggers, during the out-of-window repair phase, loss reports from receivers having packet losses.

18. The method of claim 13 further comprising aggregating the loss reports received from different receivers in order to minimize a number of repair packets that need to be transmitted for the particular segment.

* * * * *